(12) United States Patent
Ding et al.

(10) Patent No.: US 7,596,352 B2
(45) Date of Patent: Sep. 29, 2009

(54) APPARATUS AND METHOD FOR CHANNEL ESTIMATION AND ECHO CANCELLATION IN A WIRELESS REPEATER

(75) Inventors: Yinong Ding, Plano, TX (US); Cornelius Van Rensburg, Dallas, TX (US); Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 740 days.

(21) Appl. No.: 11/145,619

(22) Filed: Jun. 6, 2005

(65) Prior Publication Data

US 2006/0040611 A1    Feb. 23, 2006

Related U.S. Application Data

(60) Provisional application No. 60/603,734, filed on Aug. 23, 2004, provisional application No. 60/603,735, filed on Aug. 23, 2004.

(51) Int. Cl.
*H04Q 7/20*    (2006.01)
(52) U.S. Cl. .......................... 455/11.1; 455/7; 455/24; 455/12.1; 455/13.1; 370/315; 370/318; 370/322; 370/328; 370/316

(58) Field of Classification Search ................ 455/11.1, 455/7, 24, 67.11, 500, 517, 422.1, 403, 550.1, 455/67.13, 69, 445, 12.1, 13.1, 426.1, 426.2; 370/313–327, 310, 328, 329
See application file for complete search history.

(56) References Cited

U.S. PATENT DOCUMENTS

| | | | | |
|---|---|---|---|---|
| 5,847,663 | A * | 12/1998 | Chasek | 340/905 |
| 7,139,580 | B2 * | 11/2006 | Stein et al. | 455/456.1 |
| 7,398,053 | B2 * | 7/2008 | Kerek | 455/20 |
| 2003/0022626 | A1 * | 1/2003 | Miquel et al. | 455/24 |
| 2003/0211827 | A1 * | 11/2003 | Yonezawa et al. | 455/7 |
| 2005/0215193 | A1 * | 9/2005 | Kummetz | 455/1 |

* cited by examiner

*Primary Examiner*—Keith T Ferguson

(57) ABSTRACT

A system and method for channel estimation and echo cancellation in wireless system repeaters. A repeater with improved echo cancellation comprises an input radio control element having a receiving antenna and an output radio control element having a transmitting antenna; a power amplifier connected between the input radio control element and the output radio control element; and a signal processing unit connected between the input radio control element and the output radio control element. The signal processing unit is configured to estimate the communication channel from the transmitting antenna to the receiving antenna to produce a channel estimation. The signal processing unit is further configured to perform echo cancellation based on the channel estimation.

20 Claims, 9 Drawing Sheets

APPARATUS AND METHOD FOR CHANNEL ESTIMATION AND ECHO CANCELLATION IN A WIRELESS REPEATER

CROSS-REFERENCE TO RELATED APPLICATION AND CLAIM OF PRIORITY

The present invention is related to those disclosed in U.S. Prov. Pat. Appl. No. 60/603,734, filed Aug. 23, 2004, entitled "An Apparatus for Channel Estimation and Feedback or Echo Cancellation in a TDD Wireless Repeater" and U.S. Prov. Pat. Appl. No. 60/603,735, filed Aug. 23, 2004, entitled "An Apparatus for Channel Estimation and Feedback or Echo Cancellation in a FDD Wireless Repeater", each of which is assigned to the assignee of the present application and is incorporated by reference into the present disclosure. This application claims priority under 35 U.S.C. §119(e) to Prov. Pat Nos. 60/603,734 and 60/603,735.

The present invention is also related to those disclosed in U.S. patent application Ser. No. 11/012,411, filed Dec. 15, 2004, entitled "Wireless Repeater Using A Single RF Chain For Use In A TDD Wireless Network" and U.S. patent application Ser. No. 11/012,450, filed Dec. 15, 2004, entitled "Wireless Repeater Using Cross-Polarized Signals to Reduce Feedback in an FDD Wireless Network", each of which is assigned to the assignee of the present application and is hereby incorporated by reference into the present disclosure as if fully set forth herein.

TECHNICAL FIELD OF THE INVENTION

The present invention relates generally to wireless networks and, more particularly, to a mechanism for channel estimation in a repeater.

BACKGROUND OF THE INVENTION

Consumers use a wide range of devices and networks, including cellular phones, paging devices, personal communication services (PCS) systems, and wireless data networks. Wireless service providers create new markets for wireless devices and expand existing markets by making wireless devices and services cheaper and more reliable. Wireless service providers attract new customers by reducing infrastructure costs and operating costs, by increasing handset battery life, and improving quality of service, and new and better features.

Inadequate coverage is a persistent problem in the quality of service of any wireless network. Natural and man-made obstacles frequently create radio frequency (RF) "holes" in the coverage area of a wireless network. Voice and data call connections are frequently dropped when a wireless terminal, such as a cell phone or a similar mobile station, enters an RF hole. Mobile stations that are already in an RF hole may not be able to reliably establish new connections. Typical areas in which RF holes occur include underground tunnels, buildings that have large footprints, tall buildings, and underground shopping malls.

Wireless service providers may attempt to improve coverage by deploying RF repeater transceivers. A variety of repeaters have been developed to improve the coverage of wireless networks. However, in current wireless telecommunications systems, it is well known that the coupling of echo signals between the receive and transmit antennas of a repeater is the primary limiting factor for a good quality wireless repeater.

Various echo-cancellation techniques have been attempted, but often cannot work well in digital repeater applications for a number of reasons. One of the problems that known systems may encounter is the dynamic range difference between the desired signal and the echo signal. Another issue is that in a time-division duplexed (TDD) context, the adaptive filter coefficients cannot be continuously updated in the transition from transmit to receive, or vice versa.

Yet another issue has to do with the computational complexity. The signal input to the signal processing unit is typically ten to sixteen times over-sampled. Working directly with the very high sampling rate data stream as the traditional echo canceller would do should always be avoided.

Therefore, there is a need in the art for an improved system and method for wireless network repeaters.

SUMMARY OF THE INVENTION

To address the above-discussed deficiencies of the prior art, it is a primary object of the present invention to provide, for use in wireless network, a repeater with improved echo cancellation comprising: 1) an input radio control element having a receiving antenna and an output radio control element having a transmitting antenna; 2) a power amplifier connected between the input radio control element and the output radio control element; and 3) a signal processing unit connected between the input radio control element and the output radio control element. The signal processing unit is configured to estimate the communication channel from the transmitting antenna to the receiving antenna to produce a channel estimation. The signal processing unit is further configured to perform echo cancellation based on the channel estimation.

It is a further object of the present invention to provide a method for processing a wireless signal in a repeater system, comprising receiving an input signal in a repeater having an input antenna and an output antenna; performing a channel estimation of a channel between the input antenna and the output antenna; performing an echo cancellation process according to the channel estimation and the input signal to produce a corrected signal; and transmitting an output signal corresponding to the corrected signal.

It is a further object of the present invention to provide, for use in a wireless network, a repeater with improved echo cancellation, comprising: a donor antenna apparatus having a first donor antenna and a second donor antenna; a server antenna apparatus having a first server antenna and a second server antenna; and an electronic processing block connected to the donor antenna apparatus and the server antenna apparatus, wherein the second donor antenna is cross-polarized with the first donor antenna, and the second server antenna is cross-polarized with the first server antenna.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Various embodiments provide a system and method for estimation of the communication channel and cancellation of the feedback or echo between the input/receiving antenna and the output/transmitting antenna in a wireless digital repeater, generally using frequency-division duplexed (FDD) or time-division duplexed (TDD) technologies. By embedding a training sequence in the transmitted signal, the disclosed system estimates the communication channel by extracting the embedded sequence/signal which has been convolved with the channel response. Due to the facts that the training sequence(s) are embedded and have certain unique characteristics, extraction of them is reliable.

Figure 1:
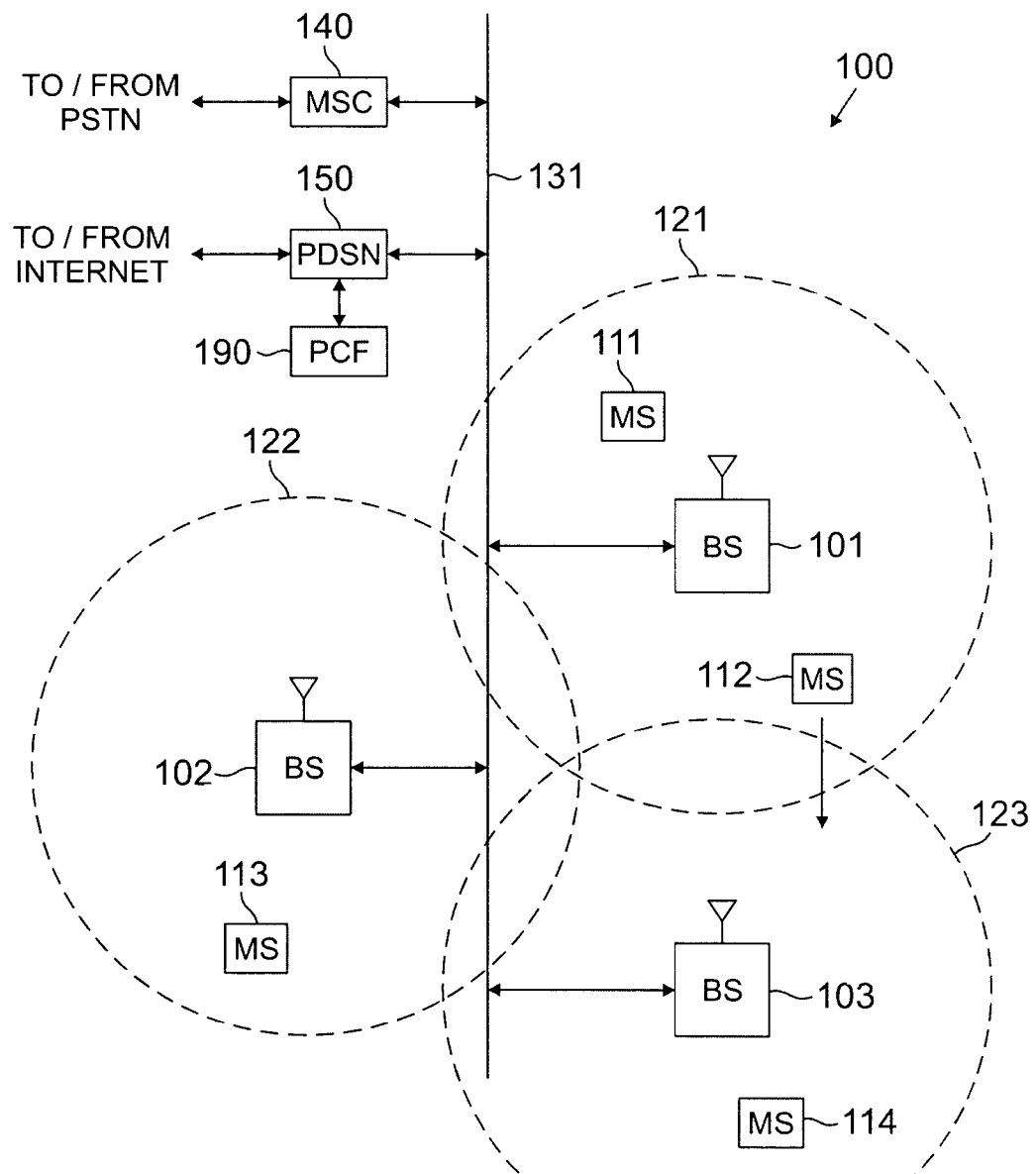
FIG. 1 illustrates exemplary wireless network, which tracks the locations of mobile stations according to the principles of the present invention.

FIG. 1 illustrates exemplary wireless network 100, which tracks the locations of mobile stations according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
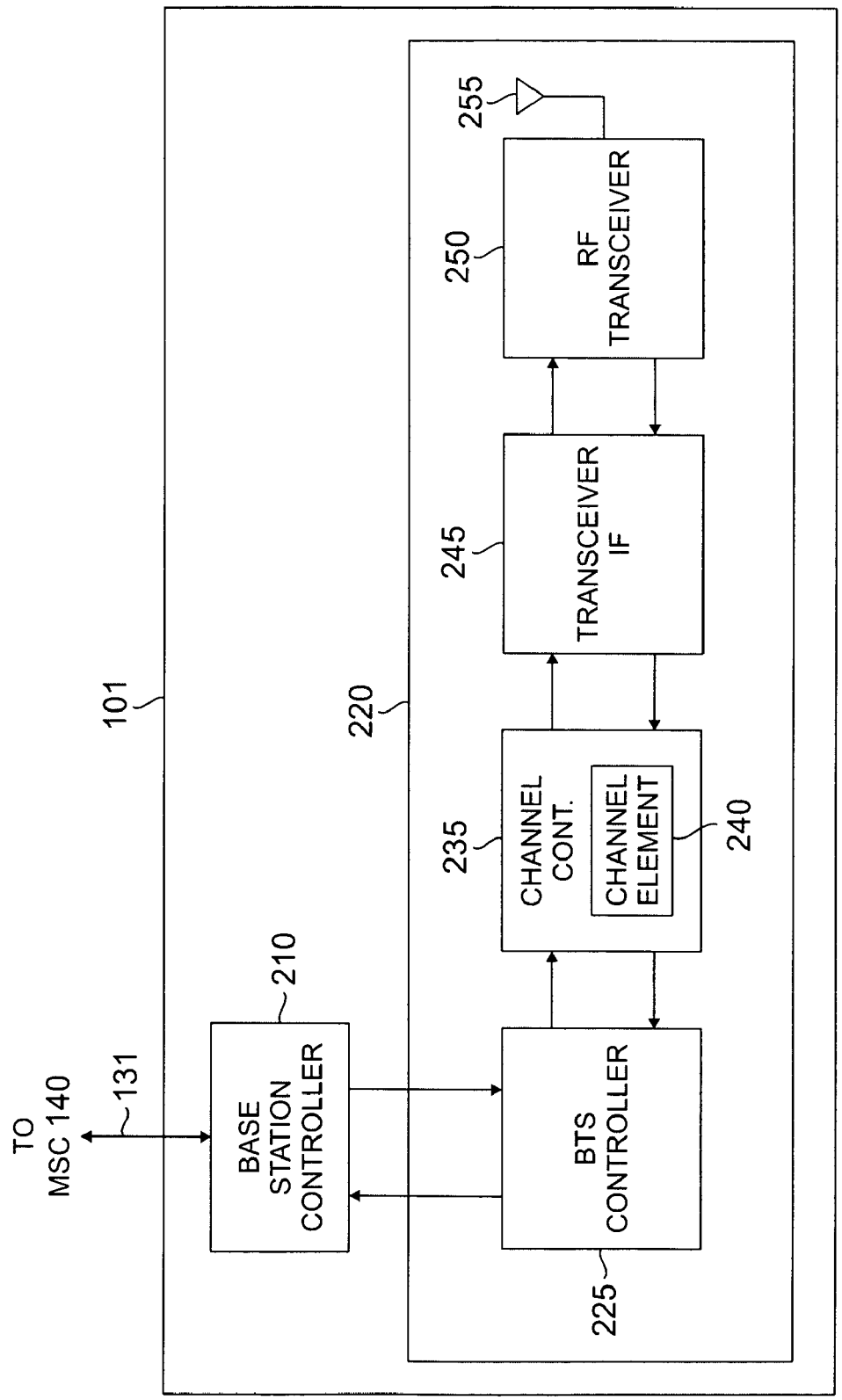
FIG. 2 illustrates exemplary base station in greater detail according to an exemplary embodiment of the present invention.
Figure 3:
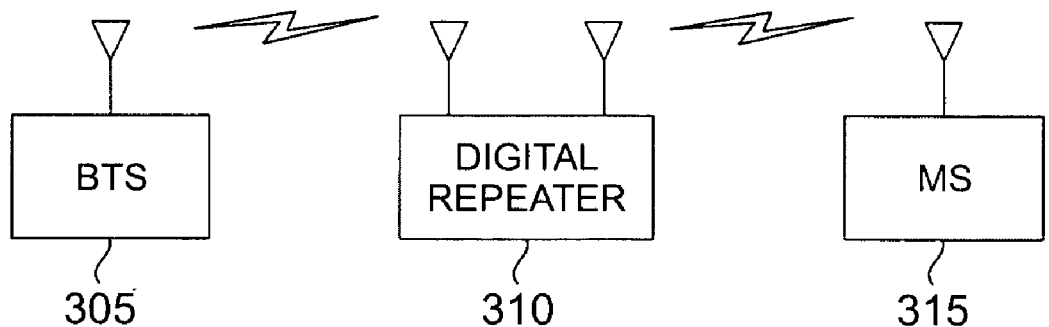
FIG. 3 depicts a typical wireless repeater scenario according to an exemplary embodiment of the present invention.

FIG. 2 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver 250.

Antenna 255 transmits forward channel signals received from RF transceiver 250 to mobile stations in the coverage area of BS 101. Antenna 255 also sends to RF transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Repeaters are used in wireless networks to extend the coverage range of a base transceiver station (BTS) to areas where distance, scattering or blockage causes large propagation losses. The repeater is placed at a location where the received signal from the BTS is to weak to maintain a desired quality of service (QoS) or to achieve a certain performance threshold. For the down-link signal, the repeater receives the signal from the BTS on a donor receive antenna. It then filters, processes, amplifies, and retransmits the signal on a server antenna into regions where signal from the BTS is too low for reliable reception. For the up-link signal, the repeater receives the signal from the mobile station or user terminal on a server receive antenna. It then filters, processes, amplifies, and retransmits the signal to the BTS on a donor transmit antenna.

Of course, in a typical wireless repeater scenario, there are also typically many scattering or blocking structures, not shown.

Figure 4:
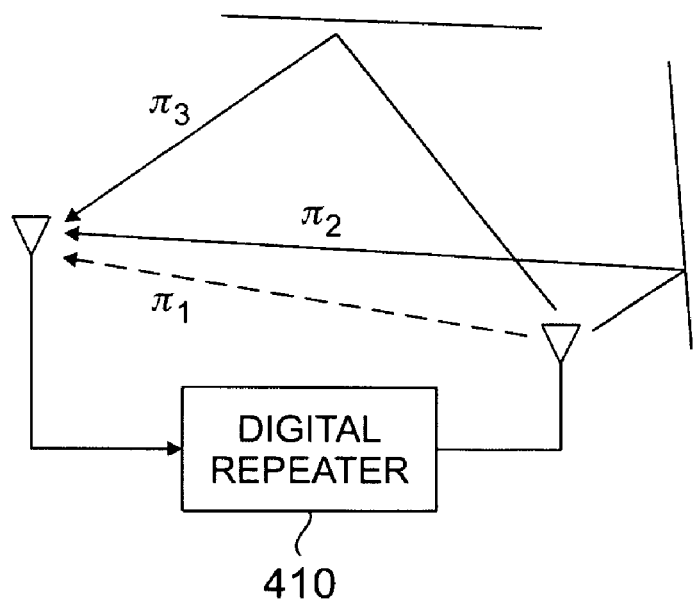
FIG. 4 depicts feedback paths between server and donor antennas for downlink signals.

Because the repeater electronic circuit chain receives and transmits on the same frequency, it is possible for feedback to occur. Amplified, time-delayed signals are coupled between the output antenna and the input antenna through a combination of conduction terms ($\pi_1$) and scattering terms ($\pi_2$, $\pi_3$, etc.) as illustrated in FIG. 4. FIG. 4 depicts feedback paths between server and donor antennas for downlink signals. The repeater processing has to remove any time-delayed echoes coupled from the repeater transmit antenna and the repeater receive antenna for each of the down-link and up-link signals being repeated.

Figure 5:
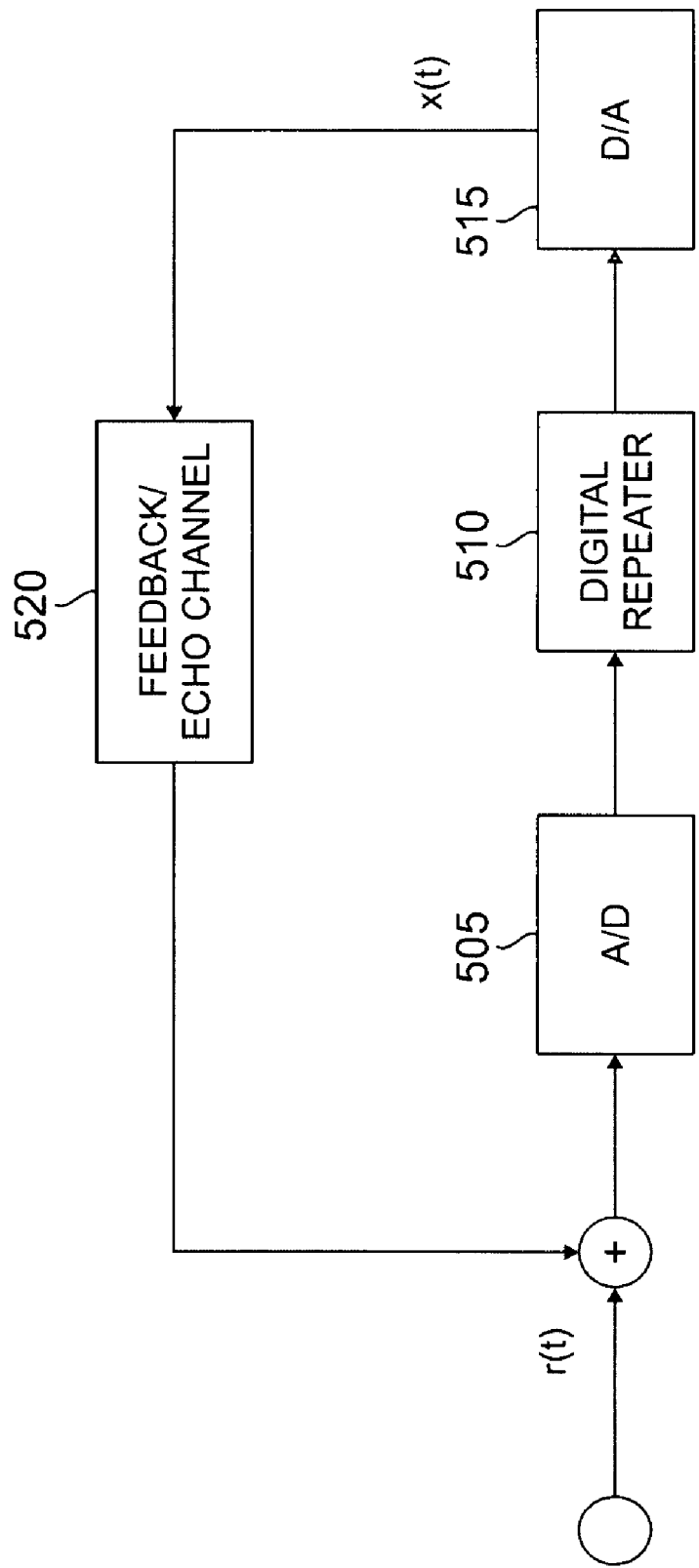
FIG. 5 depicts a reference model for a wireless repeater with multi-path feedback for either downlink or uplink, in accordance with an exemplary embodiment of the present invention.

The multi-path/scattering/reflection effects shown in FIG. 4 can be modeled by a system with a finite length of impulse response (FIR), h[n], or its Fourier Transform counter part, H(ω). FIG. 5 is a reference model for a wireless repeater where r(t) is the signal arriving at the repeater receive antenna, and x(t) is the signal to be transmitted by the transmit antenna, in accordance with an exemplary embodiment of the present invention. Ideally, x(t) is an amplified copy of r(t).

FIG. 5 depicts a reference model for a wireless repeater with multi-path feedback for either downlink or uplink, in accordance with an exemplary embodiment of the present invention. A preferred embodiment includes a method to estimate the channel response h[n], or H(ω) in order to remove the feedback/echo of x(t) to the receiving end of the repeater.

Figure 6:
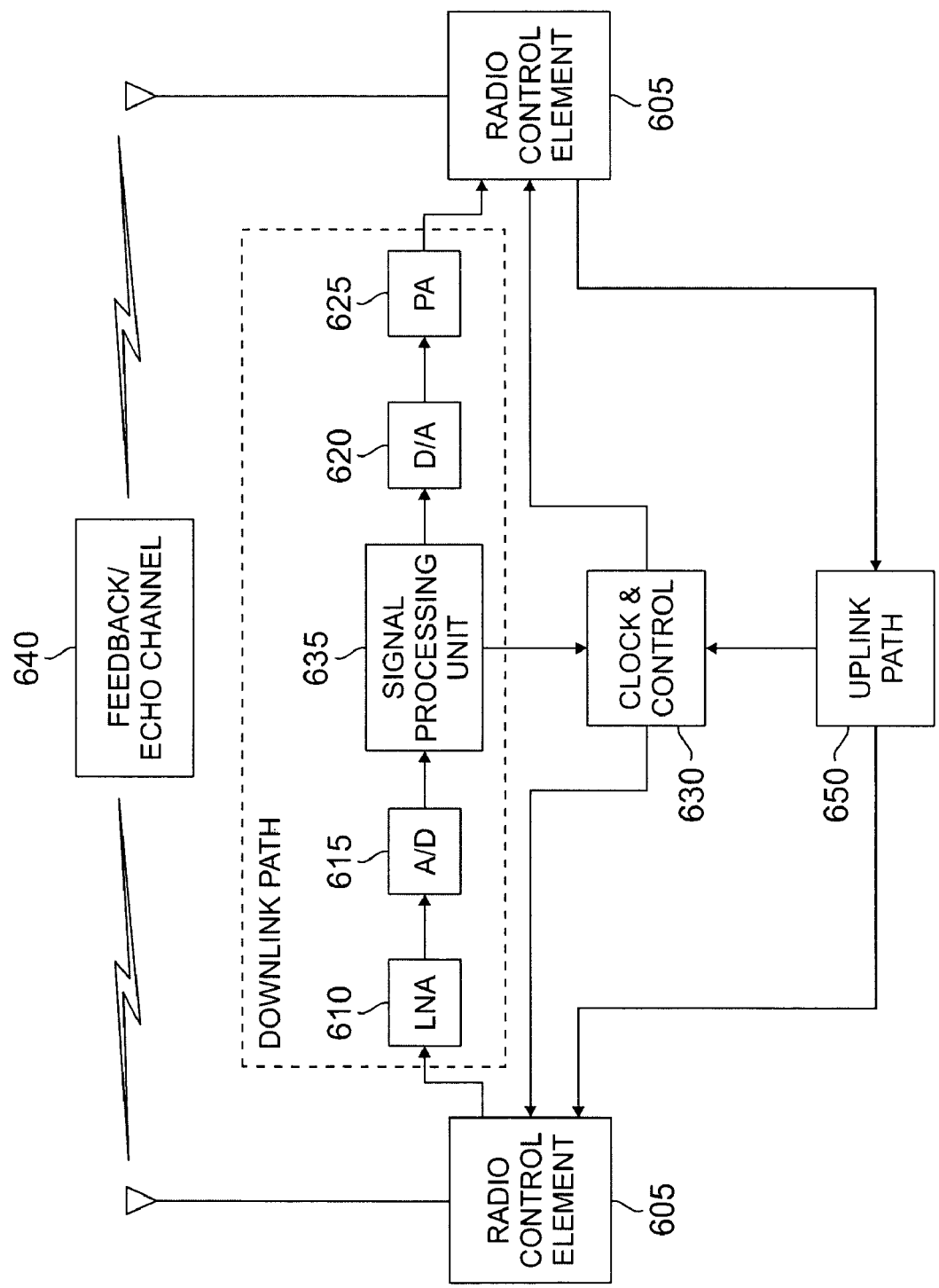
FIG. 6 is a block diagram of a wireless digital repeater in accordance with an exemplary embodiment of the present invention.

FIG. 6 is a block diagram of a wireless digital repeater in accordance with an exemplary embodiment of the present invention, which, with slight modification, can be implemented in either an FDD or TDD system. The uplink path 650 has similar blocks as in the downlink path, but is not shown in detail here for the sake of clarity. The functions of each block are outlined below, and feedback/echo channel 640 is shown.

Radio control element 605: When implemented in an FDD system, this element is implemented as a frequency duplexer of the repeater based on the wireless system FDD configuration. In a TDD system, radio control element 605 is implemented as a transmit/receive switch to control the transmitting and receiving timing of the repeater based on the wireless system TDD clock.

LNA 610: Low noise amplifier 610 is used for the amplification of weak signals arriving from a remote BTS. An LNA may or may not be necessary for the uplink path 650, depending on the implementation, as those of skill in the art will recognize.

A/D 615: Analog-to-digital converter 615 is used to convert the signal from analog to digital. The dynamic range of the A/D converter 615 needs to be carefully determined by the receive sensitivity requirement, the transmit power level and the transmit-to-receive isolation requirement for both downlink and uplink paths.

D/A 620: Digital-to-analog converter 620 is to convert the signal from digital to analog.

PA 625: Power amplifier 625 is used to amplify the signal to the desired transmitting power level.

Clock & Control 630: This block provides the repeater system clock and other control signals, including a TDD control signal in a TDD implementation.

Signal Processing Unit 635: This is the core of the wireless repeater. The functions/tasks this unit performs and accomplishes preferably include: estimating the communication/coupling channel from the transmitting antenna to the receiving antenna; performing feedback/echo cancellation based on the channel estimation. Further, in a TDD implementation, the signal processing unit 635 obtains the wireless system TDD clock information and provides reference timing for the clock & control unit to generate the TDD control signal. In an FDD implementation, the signal processing unit 635 obtains the wireless system data frame information and provides reference timing for the clock & control unit to generate a local data frame control signal.

Figure 7:
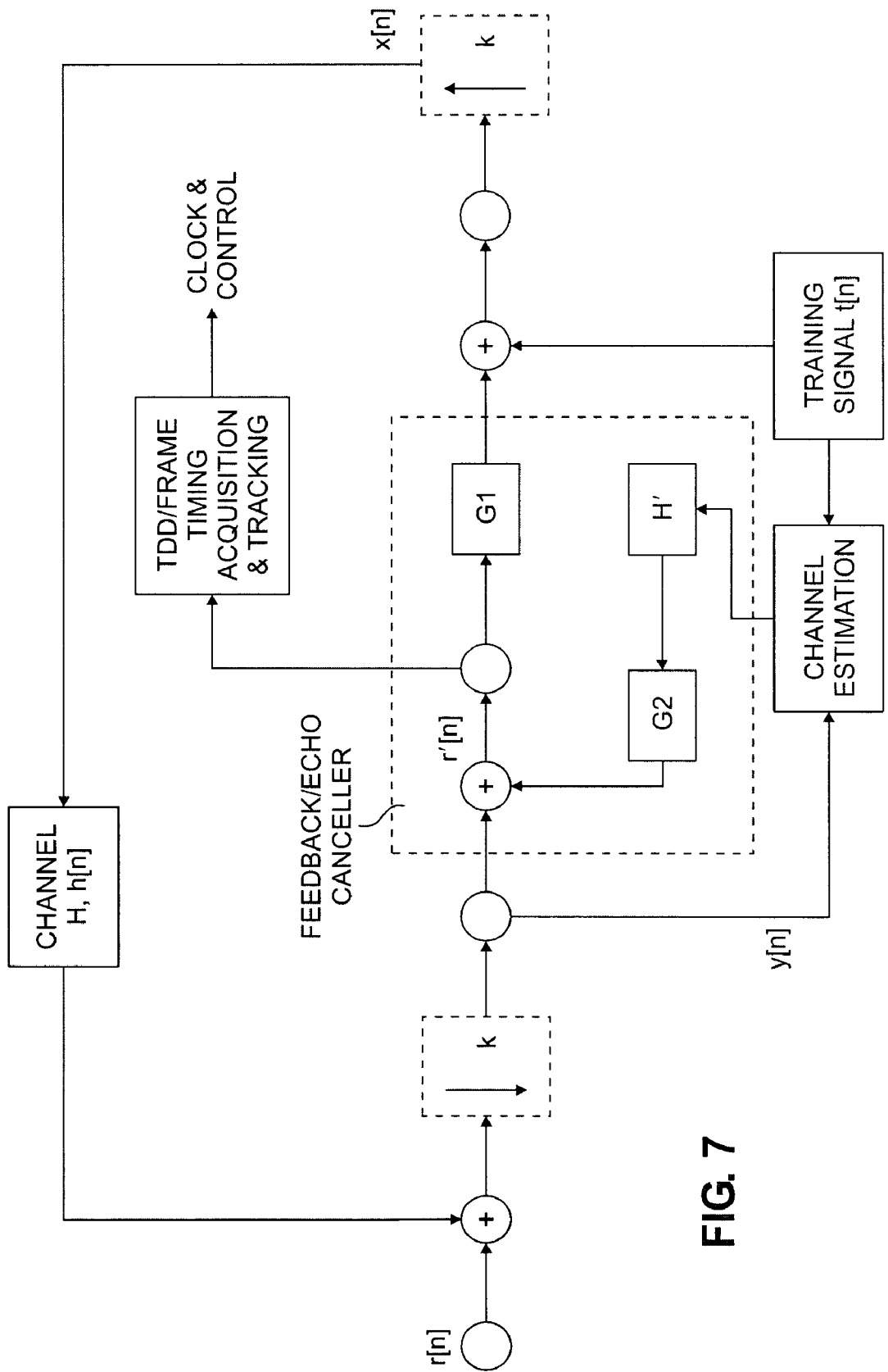
FIG. 7 is a digital model of a wireless repeater in accordance with an exemplary embodiment of the present invention.

FIG. 7 is a digital model of a wireless repeater in accordance with an exemplary embodiment of the present invention, corresponding to the more detailed description of the signal processing unit below. Note that an optional downsampler or up-sampler is added at the receiving and transmitting ends, respectively. These re-samplers could be used for the reduction of the computational complexity.

A training signal or training sequence is used to aid the channel estimation which is to be discussed in the next subsection. Typically, a pseudo-noise (PN) sequence is chosen to form the training signal. Since the training signal is embedded in the desired signal, the length of the PN sequence must be determined carefully so that a sufficient processing gain can be achieved. Assume p[n] is a PN sequence of length P, then the following correlation property holds approximately:

$$\Sigma p[n]^* p[n-m] = P \cdot \delta[m], \qquad \text{[Eqn. 1]}$$

where $(\cdot)^*$ represents complex conjugate operation and $\delta[n]$ is the kronecker delta function.

Another option for the forming of a training signal is to use a specially designed circularly orthogonal sequence. Assume c[n] is such a sequence, then the following circular orthogonal property holds:

$$\sum_{n=1}^{N} c[n]^* c([n-m]_N) = N \cdot \delta([n-m]_N), \qquad \text{[Eqn. 2]}$$

where $[n-m]_N$ is the remainder of n−m with respect to the base N.

As described above, the multi-path/scattering/reflection effects of the communication channel between the transmitting antenna and the receiving antenna can be modeled by an FIR system. Assume the impulse response of the channel is h[n], and has a length of L+1, the objective of the channel estimation block is to estimate or identify h[n]. The training signal is formed using the PN sequence as follows:

$$t[n] = \begin{cases} p[n], n = 1, 2, \ldots, P \\ 0, n = P+1, \ldots, N \end{cases}, \qquad \text{[Eqn. 3]}$$

where N is the length of the training signal and N≧P+L. Then the input to the channel estimator, denoted as y[n], can be obtained by referring to the signal model shown in FIG. 5 as $$y[n]=r[n]+(G_1 \cdot r'[n]+t[n]) \otimes h[n]+w[n], n=1,2,\ldots N, \qquad \text{[Eqn. 4]}$$

where ⊗ is the linear convolution operator, and w[n] is the additive noise. Further expanding Equation (4) produces $$\begin{aligned} y[n] &= r[n] + (G_1 \cdot r'[n] + t[n]) \otimes h[n] + w[n] \qquad \text{[Eqn. 5]} \\ &= r[n] + G_1 \cdot r'[n] \otimes h[n] + t[n] \otimes h[n] + w[n] \\ &= r[n] + u[n] + v[n] + w[n], \\ n &= 1, 2, \ldots (N+2^*L), \end{aligned}$$

where $u[n]=G_1 \cdot r'[n] \otimes h[n]$, and $v[n]=t[n] \otimes h[n]$. By taking the autocorrelation operation of y[n] and t[n], we obtain $$\begin{aligned} t_r[n] \otimes y[n] &= t_r[n] \otimes r[n] + t_r[n] \otimes u[n] + t_r[n] \otimes \\ & t[n] \otimes h[n] + t_r[n] \otimes w[n] = P \cdot h[n] + \\ & t_r[n] \otimes r[n] + t_r[n] \otimes u[n] + t_r[n] \otimes w[n], \qquad \text{[Eqn. 6]} \end{aligned}$$

Where $t_r[n]$ is the reversal of the training sequence t[n]. Note that if the PN sequence is chosen to be sufficiently long, the channel response h[n] can be extracted from the correlation result $t_r[n] \otimes y[n]$.

If a circularly orthogonal sequence is used, the training signal can be formed as follows:

$$t_c[n] = \{c[N-L+1], c[N-L+2], \ldots, c[N], c[1], c[2], \ldots c[N]\} \qquad \text{[Eqn. 7]}$$

The first L samples of $t_c[n]$ are prefix added to create the circular nature for the training signal. Then the input to the channel estimator is $$y[n]=r[n]+(G_1 \cdot r'[n]+t_c[n]) \otimes h[n]+w[n]. \qquad \text{[Eqn. 8]}$$

Further expand Equation (8), we have $$\begin{aligned} y[n] &= r[n] + (G_1 \cdot r'[n] + t_c[n]) \otimes h[n] + w[n] \qquad \text{[Eqn. 9]} \\ &= r[n] + G_1 \cdot r'[n] \otimes h[n] + t_c[n] \otimes h[n] + w[n] \\ &= r[n] + u[n] + v[n] + w[n], \\ n &= 1, 2, \ldots (N+2^*L), \end{aligned}$$

where $u[n]=G_1 \cdot r'[n] \otimes h[n]$, and $v[n]=t_c[n] \otimes h[n]$. Let us examine the $(L+1)^{th}$ to $(N+L)^{th}$ samples of y[n], and represent them by $$y_1[m]=r[m]+u[m]+v[m]+w[m], m=1,2,\ldots N. \qquad \text{[Eqn. 10]}$$

Due to the circular nature of $t_c[n]$, it is recognized that v[m] is nothing but the N-point circular convolution of c[m] and h[m]. It is easy to see that if we take the N-point circular convolution of $y_1[m]$ and c[m], and use the circularly orthogonal property in (2), the channel response can be extracted from the circular convolution result. In practice, this circular convolution can be done efficiently using fast Fourier Transform (FFT). To see this, let us first write (10) in vector form, that is, $$\underline{y}_1 = \underline{r} + \underline{u} + \underline{v} + \underline{w}. \quad \text{[Eqn. 11]}$$

Let T be an N×N circulant matrix formed from the circular orthogonal sequence c[n]. T can be decomposed as:

$$T = F \cdot \Lambda \cdot F^H, \quad \text{[Eqn. 12]}$$

where F and $F^H$ are inverse FFT and forward FFT matrices, respectively. $(\cdot)^H$ indicates the complex conjugate transpose operation. $\Lambda$ is the diagonal matrix containing the eigenvalues of T. The N-point circular convolution of c[m] and $y_1[m]$ can be obtained by $$T \cdot \underline{y}_1 = F \cdot \Lambda \cdot F^H \cdot \underline{y}_1 = N \cdot h[m] + F \cdot \Lambda \cdot F^H \cdot (\underline{r} + \underline{u} + \underline{w}). \quad \text{[Eqn. 12]}$$

From the above expression, we see that the circular convolution can be performed by first taking the FFT of $\underline{y}_1$, multiplying the FFT result with a diagonal matrix $\Lambda$, and then taking the inverse FFT of the product.

Once the channel response is estimated, the corresponding block in the feedback/echo canceller unit is updated, and the feedback cancellation can then be performed on a sample-by-sample basis.

For a TDD digital repeater implementation to work properly, the TDD timing of the wireless system must be acquired and tracked so that the repeater's transmitter and receiver can work in sync to the wireless system. The tack of acquiring and tracking the TDD timing of the wireless system is performed by the TDD acquisition and tracking unit as shown in FIG. 7. The output of the timing acquisition and tracking unit is sent to the clock and control unit to generate a local TDD timing signal for the digital repeater.

Frame timing acquisition and tracking in an FDD implementation: In order for an FDD digital repeater implementation to work in sync to the wireless system on a frame-by-frame basis, the data frame timing of the wireless system must be acquired and tracked. This also simplifies the clock and control functions of the repeater system, and the updating process of the channel response. The task of acquiring and tracking the data frame timing of the wireless system is performed by the frame timing acquisition and tracking unit as shown in FIG. 7. The output of the frame timing acquisition and tracking unit is sent to the clock and control unit to generate a local FDD data frame signal for the digital repeater.

The channel estimation approach disclosed herein uses a separate signal route as opposed to the feedback/echo cancellation route when the communication channel between the transmitting antenna and the receiving antenna is slowly varying. The addition of a training signal makes the channel estimation more accurate and straightforward. The data frame rate the channel estimation block is operating and the channel response updating rate can be made adaptive according to the nature and varying speed of the communication channel. Because the feedback cancellation is based on the estimated channel response, the dynamic range difference between the feedback signal and the desired signal can be made significantly larger.

Figure 8:
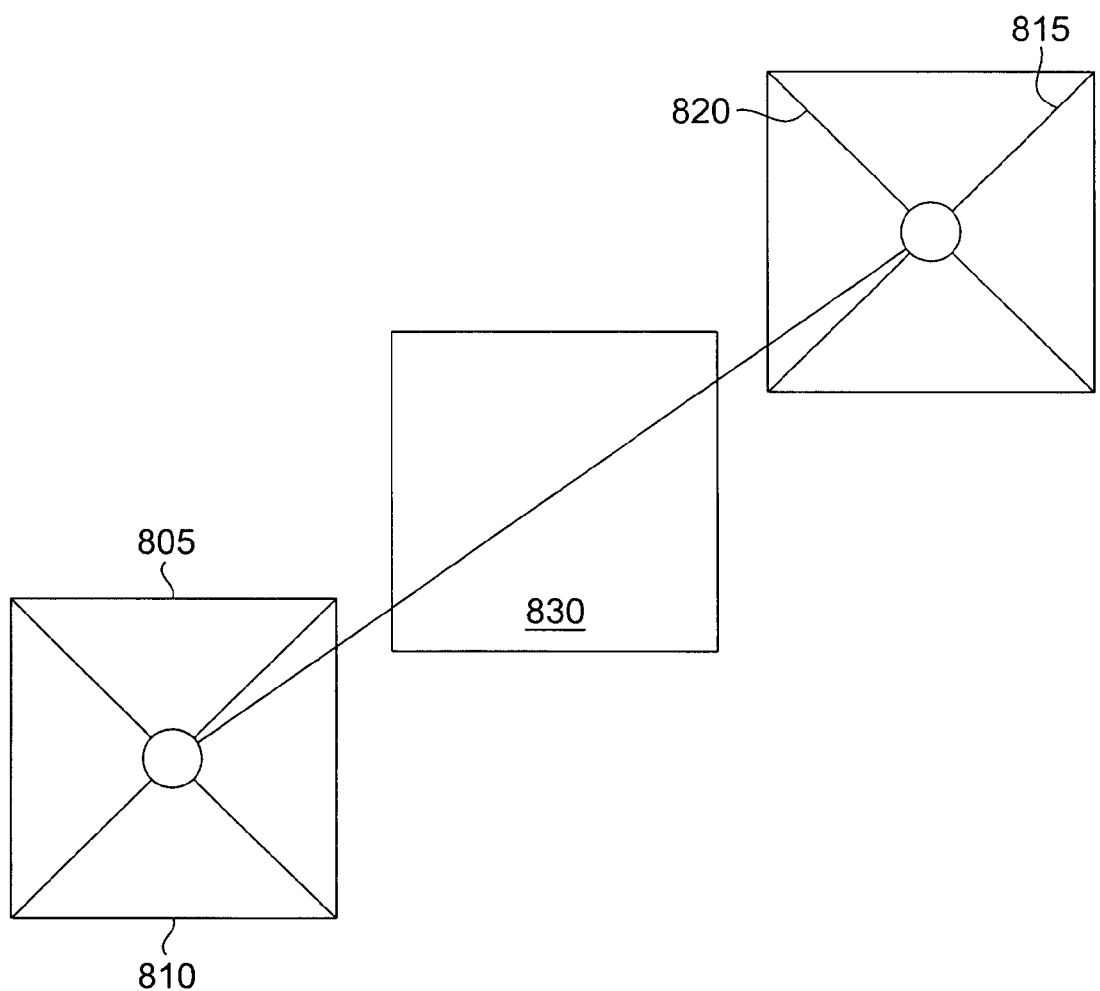
FIG. 8 depicts a cross-polarized donor and server antenna configuration to detect signals transmitted by an opposite face, in accordance with an exemplary embodiment of the present invention.

An alternate embodiment includes a method and procedure for determining echo time delay and relative amplitude by means of a least mean square filter in a wireless repeater. FIG. 8 depicts a cross-polarized donor and server antenna configuration to detect signals transmitted by an opposite face, in accordance with an exemplary embodiment of the present invention.

This embodiment uses a first donor antenna 805, which is cross-polarized with a first server antenna 820 on the opposite face. The first donor antenna 805 receives signals transmitted by the BTS on the down-link frequency and transmits signals to the BTS on the up-link frequency. The first server antenna 820 transmits signals to the mobile stations in the repeater coverage area on the down-link frequency and receives signals transmitted by the mobile stations on the uplink frequency.

Further, this embodiment uses a second donor antenna 810, co-polarized with the first server antenna 815 and cross-polarized with the first donor antenna 805, to detect the time-delayed echo signals transmitted by the first server antenna 815 on the opposite face. The second donor antenna 810 receives signals of like polarization transmitted by the first server antenna 815.

This embodiment uses a second server antenna 820, co-polarized with the first donor antenna 805 and cross-polarized with the first server antenna 815. Second server antenna 820 is used to receive the time-delayed echo signals transmitted by the first donor antenna 805 on the opposite face.

Also shown is electronic processing block 830, described in more detail below.

Figure 9:
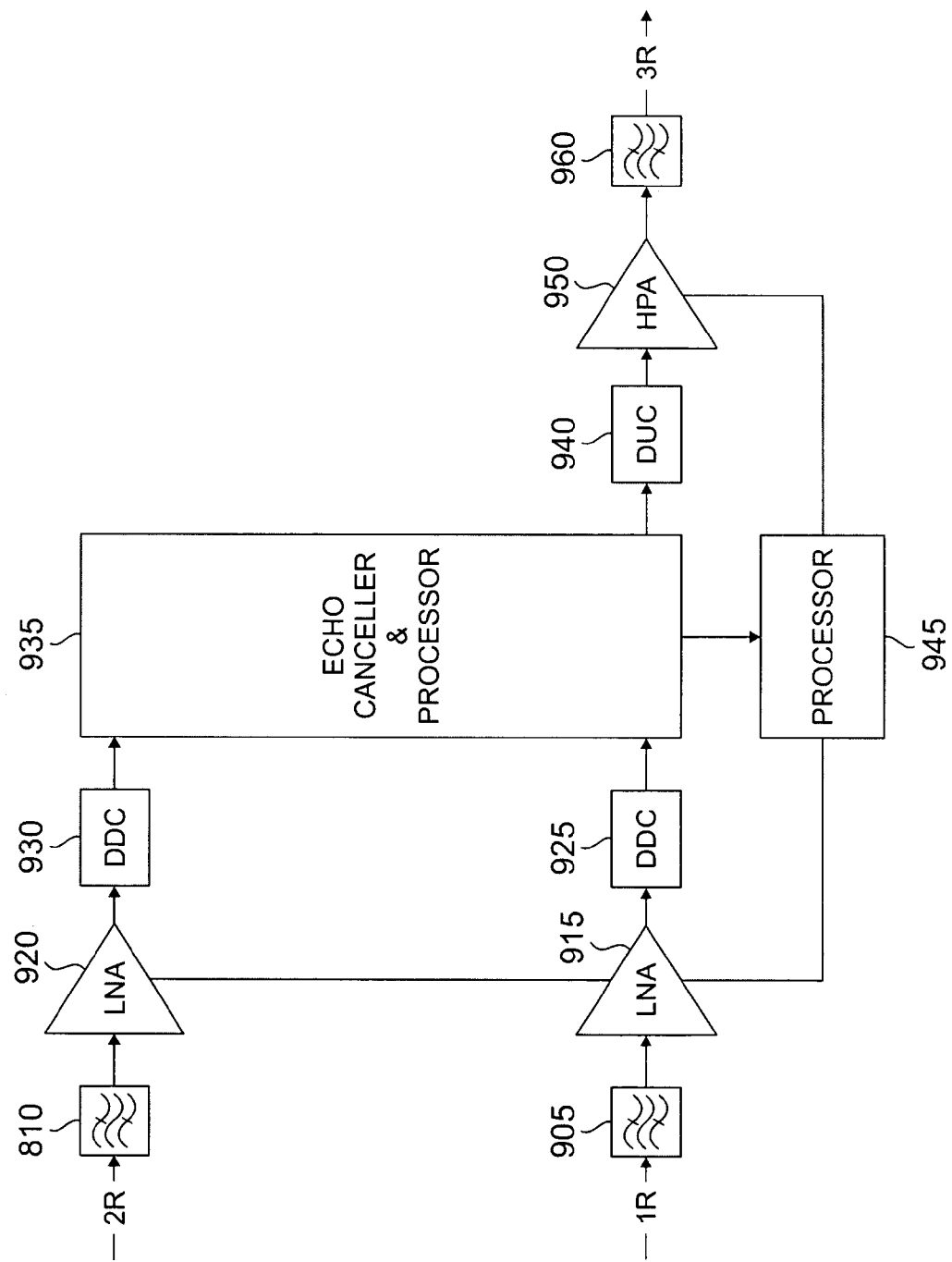
FIG. 9 depicts a block diagram for an electronic processing block in accordance with a exemplary embodiment of the present invention.

FIG. 9 depicts a block diagram for an electronic processing block in accordance with a exemplary embodiment of the present invention, which can be implemented as the electronic processing block 830 in FIG. 8.

Here, filter 905 removes, out-of-band signals form the signals received from the primary antenna. Filter 910 removes out-of-band signals from the signal received on port 1R from secondary. Low noise amplifier (LNA) 920 amplifies the signal received on port 1R to the level required for processing by echo canceller and processor 925. LNA 915 produces a noise signal used as a reference for signal for detection of echo signals by echo canceller and processor block 935.

A digital down conversion (DDC) block 925 samples the signal from LNA 915 and down-converts the signal to an IF or baseband frequency. The A/D sampling may be performed in the RF band of the received signal or it can perform sampling of a digitally down-converted signal at an intermediate frequency.

The samples are taken over a time interval that represents the maximum propagation time expected for the latest arriving echo. To reduce the throughput of sampled data (bits/sec), sub-Nyquist sampling rates in either the RF band or in the IF band can be used.

DDC 925 and DDC 930 have the dynamic range to sample the received signal as well as received noise. DDC 925 and DDC 930 have the sampling frequency to differentiate the original, non-delayed signal from the amplified, delayed echo. The echo processor and canceller 935 determine the amplitude and time delay of the echo signals received on port 2R. The echo processor and canceller 935 adjust the amplitude and time delay of the echo signals received on port 2R and to match any echo signal on port 1R.

The matched signal is then subtracted from the signal received on the first donor antenna, thereby removing any echo terms that could cause instabilities or positive feedback.

The adjusted signal is then converted to an RF signal by digital upconverter (DUC) 940 and amplified by power amplifier 940. Filter 960 is used to remove out-of-band signals present at the output of power amplifier 950. The output signal from filter 960 is then directed to port 3R of the electronic processing block.

Processor block 945 adaptively adjusts the gain of LNA 915 and LNA 920. For multiband operation, the center frequency for filters 905, 910, and 950 can be controlled by processor 945.

Figure 10:
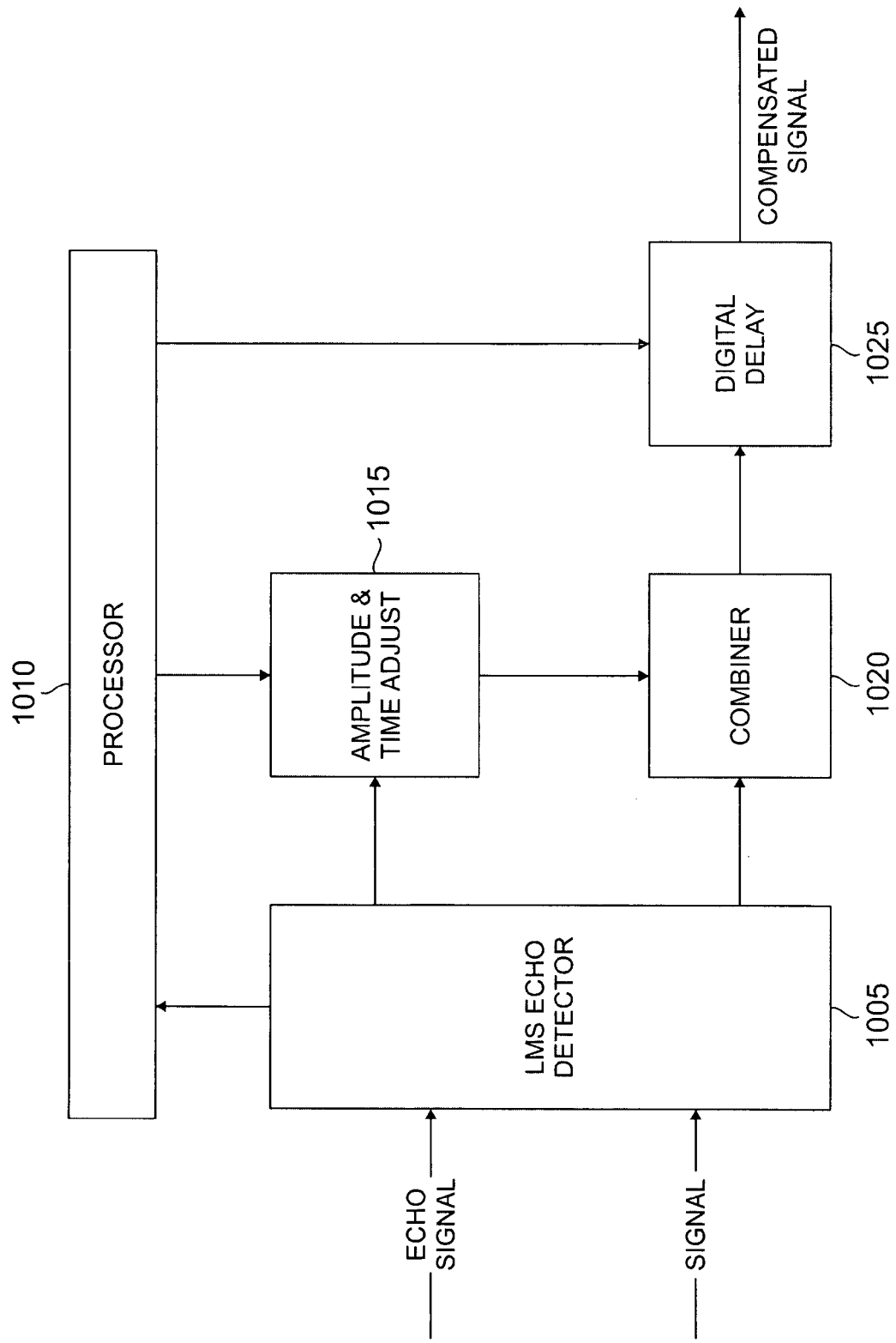
FIG. 10 depicts a block diagram of an echo canceller and signal processor in accordance with an exemplary embodiment of the present invention.

FIG. 10 depicts a block diagram of an echo canceller and signal processor in accordance with an exemplary embodiment of the present invention, which can be used to implement echo canceller and processor 935 in FIG. 9.

Here, the LMS echo detector 1005 uses well-known least means square (LMS) finite impulse response filter (FIR) or infinite impulse response (IIR) filter techniques to find the time delay of the echo signal on port 2R that best matches the signal on port 1R. The processor 1010 reads the time delay of the digitized echo signal in block 1015 such that when it is inverted and combined with the primary signal in combiner 1020, any echo signal in the primary signal is minimized or removed.

A digital delay block 1025 delays the compensated signal in order to decorrelate noise echo signals received on port 2R. A clock (not shown) synchronizes processor 1010, amplitude and time adjust 1015, digital combiner 1020, and digital delay 1025, and data transfer between blocks.

One particular feature of this invention is the use of the noise signal generated by the LNA in the primary path 1E as a reference or training signal to determine the echo profile for the repeater environment. An alternative is to use a separate noise generator (not shown) that injects a noise signal into port 1R. This technique takes advantage of the property that a band-limited noise signal is uncorrelated after a time delay greater than the inverse of the noise bandwidth.

Digital delay 1025 is used to decorrelate the input primary noise signal received on port 1R from the echo noise signal received on port 2R. Because the repeater environment changes slowly with time, the repeater echo environment can be calibrated at repeater startup and as needed upon detection of unstable output conditions. For TDD operation, the training algorithm can be executed during the guard time between transmitted frames when the BTS transmit power is turned off.

For multiple echoes with different amplitudes and time delays, the echo canceller and signal processor adapts the relative amplitudes in different time slots to result in cancellation of echo signal from the first donor or server antenna.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a repeater with improved echo cancellation, comprising:
    an input radio control element having a receiving antenna and an output radio control element having a transmitting antenna;
    a power amplifier connected between the input radio control element and the output radio control element; and
    a signal processing unit connected between the input radio control element and the output radio control element, the signal processing unit configured to estimate the communication channel from the transmitting antenna to the receiving antenna to produce a channel estimation, the signal processing unit further configured to perform echo cancellation based on the channel estimation.

2. The repeater of claim 1, further comprising a clock component configured to send timing signals to the input radio control unit, the output radio control unit, and the signal processing unit.

3. The repeater of claim 1, wherein the repeater receives a first signal and transmits a second signal, the second signal being substantially identical to the first signal.

4. The repeater of claim 3, wherein the signal processing unit wherein said second signal comprises a training signal added by said repeater, wherein said training signal is used to estimate the communication channel.

5. The repeater of claim 1, further comprising a low noise amplifier connected between the input radio control unit and the output radio control unit.

6. The repeater of claim 1, wherein the input radio control element and output radio control element are frequency duplexers.

7. The repeater of claim 1, wherein the input radio control element and output radio control element are transmit/receive switches.

8. The repeater of claim 1, wherein an analog signal is converted to a digital signal, the digital signal being input to the signal processing unit.

9. The repeater of claim 1, wherein the output of the signal processing unit is a digital signal that is thereafter converted to an analog signal.

10. A method for processing a wireless signal in a repeater system, comprising:
    receiving an input signal in a repeater having an input antenna and an output antenna;
    performing a channel estimation of a channel between the input antenna and the output antenna;
    performing an echo cancellation process according to the channel estimation and the input signal to produce a corrected signal; and
    transmitting an output signal corresponding to the corrected signal.

11. The method of claim 10, further comprising producing timing signals for use in transmitting the output signal.

12. The method of claim 10, wherein the output signal is substantially identical to the first signal.

13. The method of claim 10, wherein the step of transmitting an output signal comprises the sub-step of adding a training signal to the corrected signal, wherein the estimating process uses the training signal to estimate the channel.

14. The method of claim 10, further comprising amplifying the output signal.

15. The method of claim 10, further comprising converting the input signal from an analog signal to a digital signal.

16. The method of claim 10, further comprising converting the corrected signal from a digital signal to an analog signal.

17. A method for processing a wireless signal in a repeater system, comprising:
    receiving an input signal in a repeater having an input antenna and an output antenna;
    performing a channel estimation of a channel between the input antenna and the output antenna;
    producing a corrected signal by performing an echo cancellation process according to the channel estimation; and
    transmitting an output signal corresponding to the corrected signal.

18. The method of claim 17, further comprising amplifying the output signal.

19. The method of claim 17, further comprising converting the input signal from an analog signal to a digital signal.

20. The method of claim 17, further comprising converting the corrected signal from a digital signal to an analog signal.

* * * * *

UNITED STATES PATENT AND TRADEMARK OFFICE
CERTIFICATE OF CORRECTION

PATENT NO. : 7,596,352 B2 Page 1 of 1
APPLICATION NO. : 11/145619
DATED : September 29, 2009
INVENTOR(S) : Ding et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

Signed and Sealed this

Twenty-eighth Day of September, 2010

David J. Kappos
*Director of the United States Patent and Trademark Office*